(No Model.) 20 Sheets—Sheet 2.
J. P. ROE & P. R. BEDLINGTON.
CLIP APPARATUS FOR TRANSPORTING LOADS BY MEANS OF ROPES OR CABLES.
No. 338,615. Patented Mar. 23, 1886.
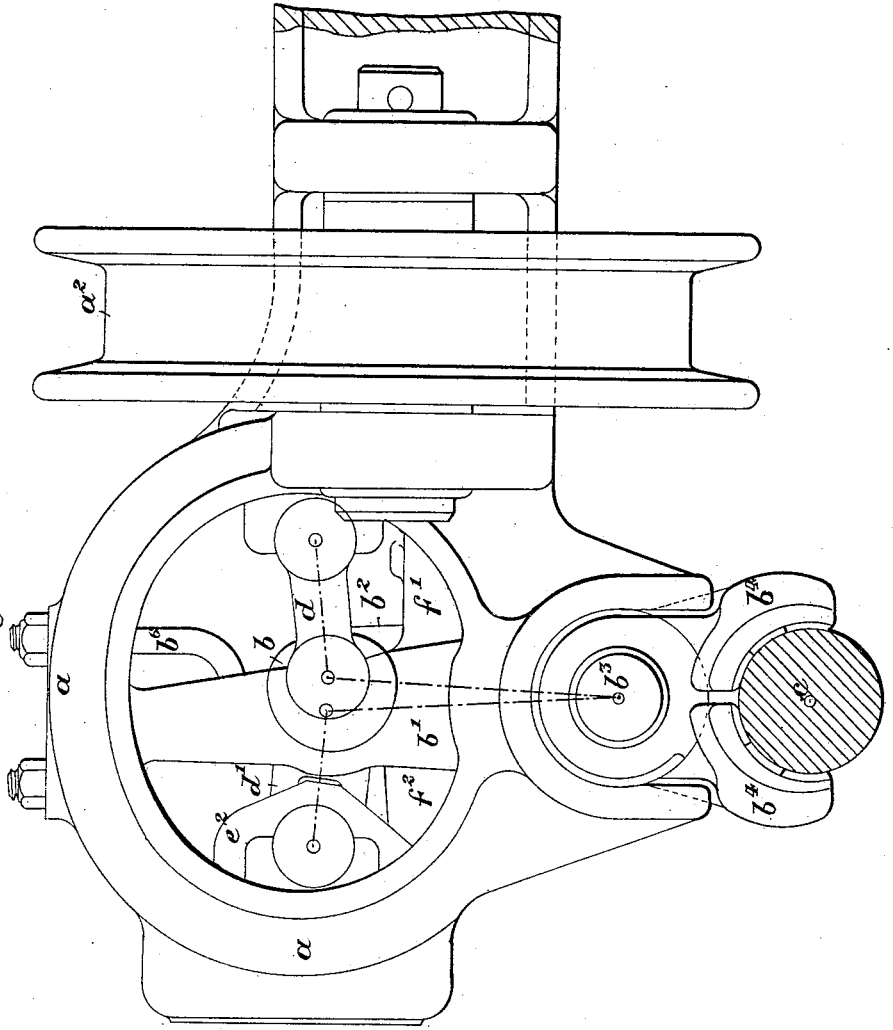
Witnesses
Geo H Shippick
U. W. Cook.
Inventors
J. P. Roe and
P. R. Bedlington
By their Atty's
Curtis & Crocker.

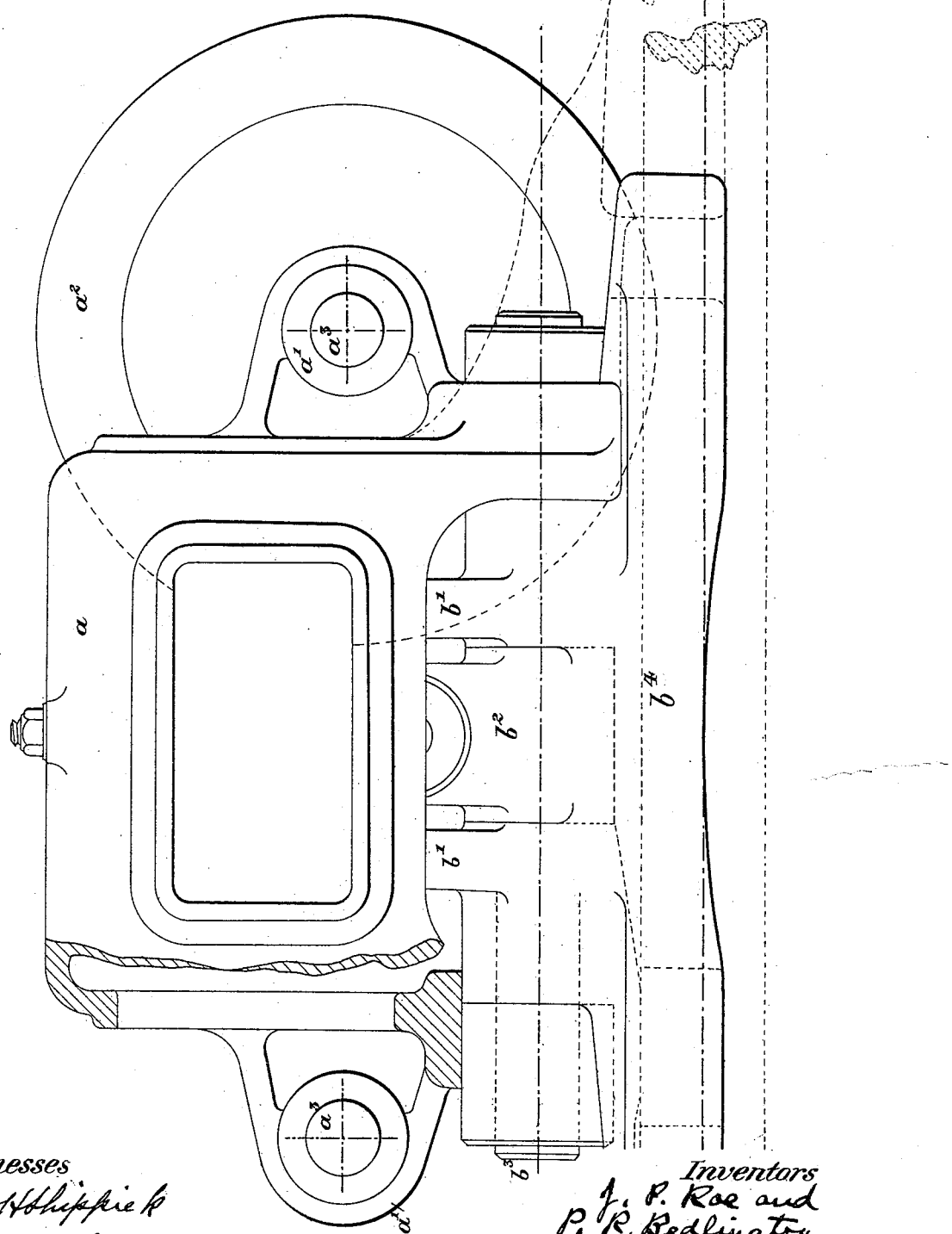

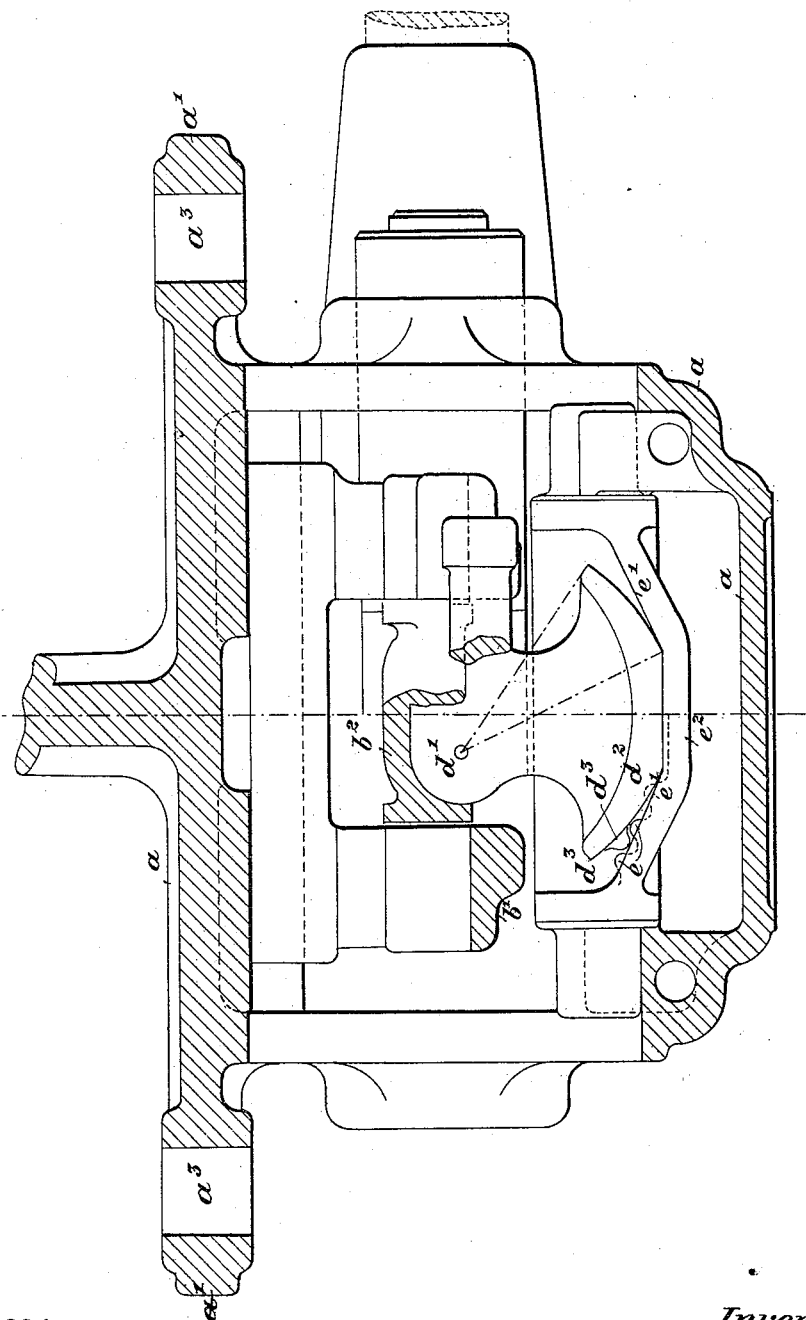

(No Model.) 20 Sheets—Sheet 4.
J. P. ROE & P. R. BEDLINGTON.
CLIP APPARATUS FOR TRANSPORTING LOADS BY MEANS OF ROPES OR CABLES.
No. 338,615. Patented Mar. 23, 1886.
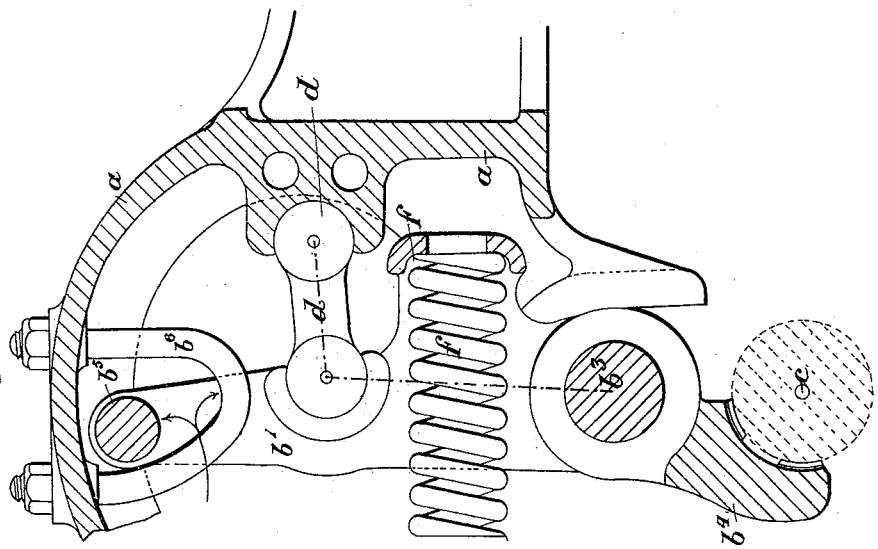
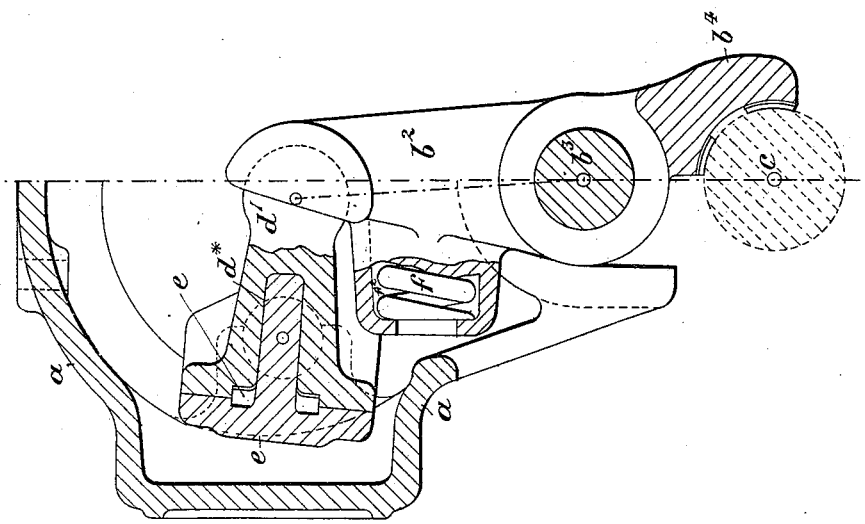
Witnesses
Geo H Strippick
M. W. Cook
Inventors
J. P. Roe and
P. R. Bedlington
By their Atty's
Curtis & Crocker.

(No Model.) 20 Sheets—Sheet 5.

J. P. ROE & P. R. BEDLINGTON.
CLIP APPARATUS FOR TRANSPORTING LOADS BY MEANS OF ROPES OR CABLES.

No. 338,615. Patented Mar. 23, 1886.

Witnesses
Geo. H. Shippick
U. W. Cook

Inventors
J. P. Roe and
P. R. Bedlington
By their Atty's
Curtis & Crocker (No Model.) 20 Sheets—Sheet 6.
J. P. ROE & P. R. BEDLINGTON.
CLIP APPARATUS FOR TRANSPORTING LOADS BY MEANS OF ROPES OR CABLES.
No. 338,615. Patented Mar. 23, 1886.
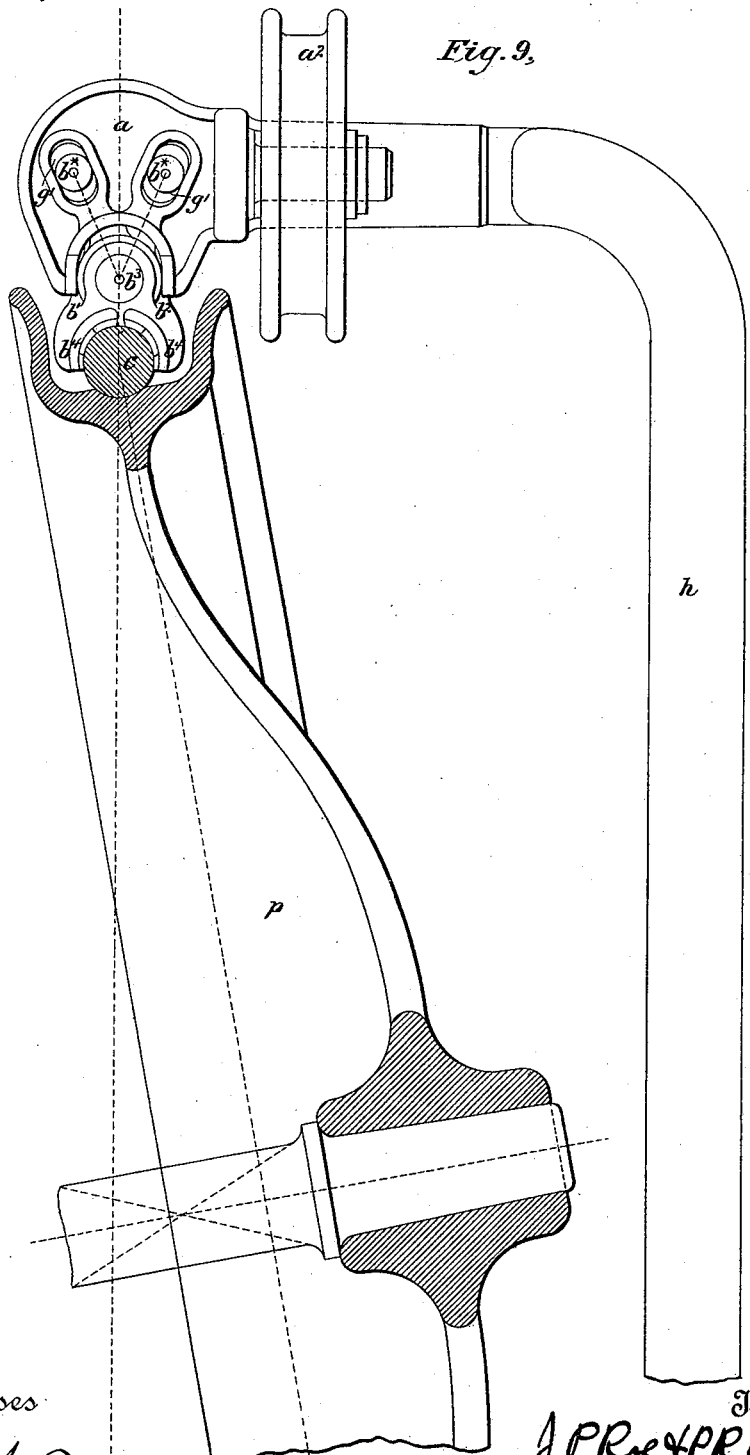

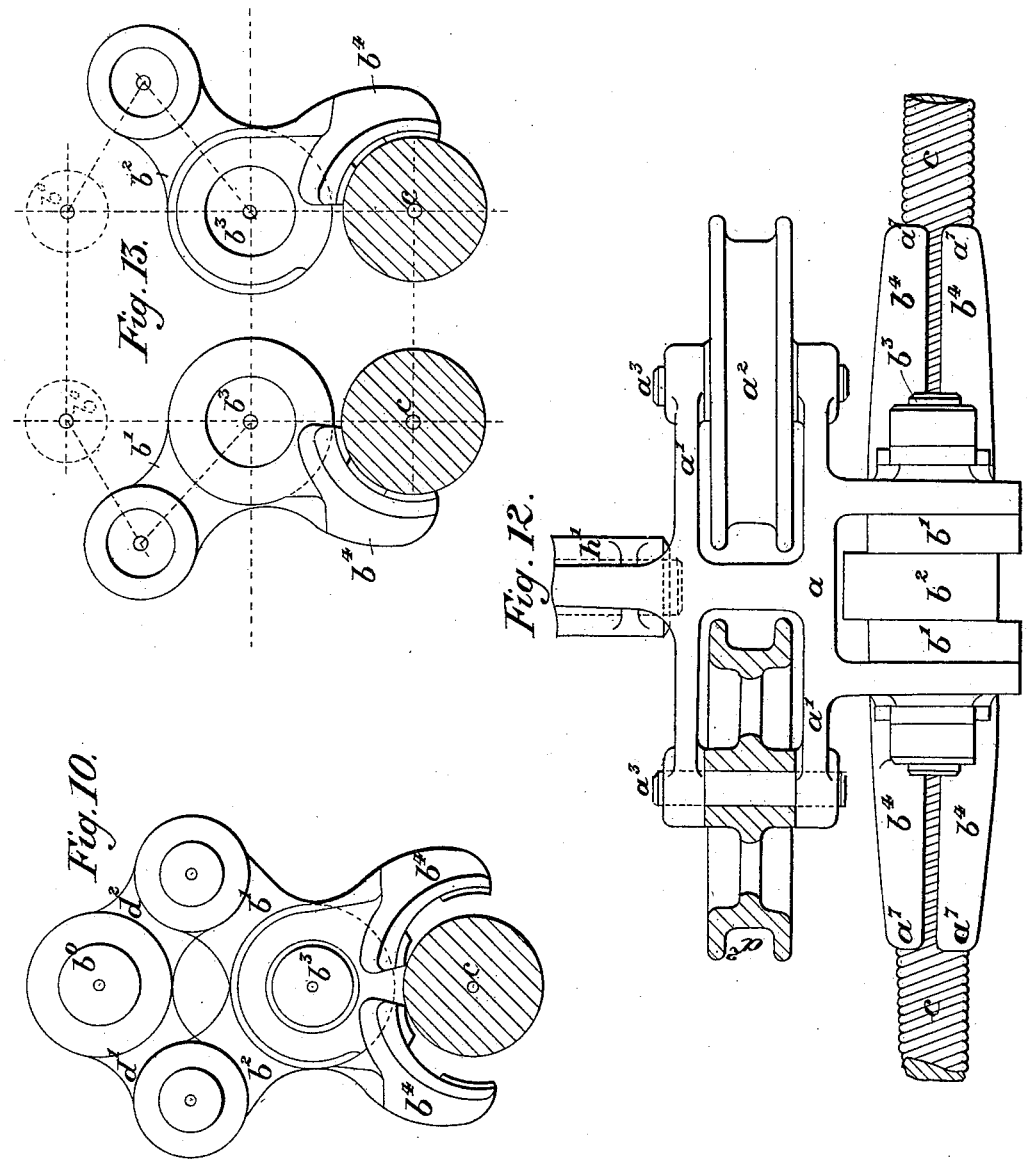

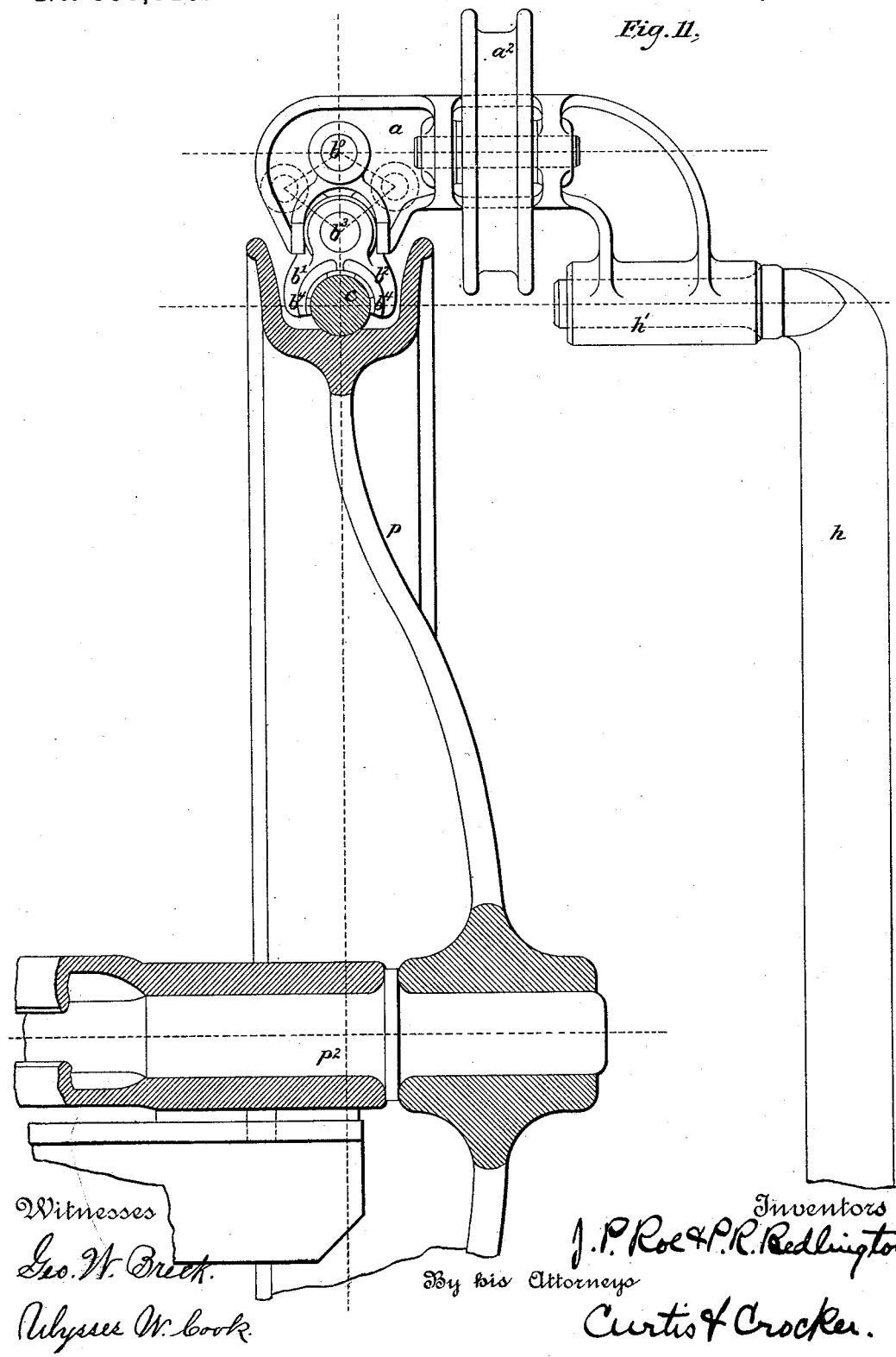

(No Model.) 20 Sheets—Sheet 9.

J. P. ROE & P. R. BEDLINGTON.
CLIP APPARATUS FOR TRANSPORTING LOADS BY MEANS OF ROPES OR CABLES.

No. 338,615. Patented Mar. 23, 1886.

Witnesses
Geo H Shippick
U. W. Cook

Inventors
J. P. Roe and
P. R. Bedlington
By their Atty's
Curtis & Crocker (No Model.) 20 Sheets—Sheet 10.
J. P. ROE & P. R. BEDLINGTON.
CLIP APPARATUS FOR TRANSPORTING LOADS BY MEANS OF ROPES OR CABLES.
No. 338,615. Patented Mar. 23, 1886.
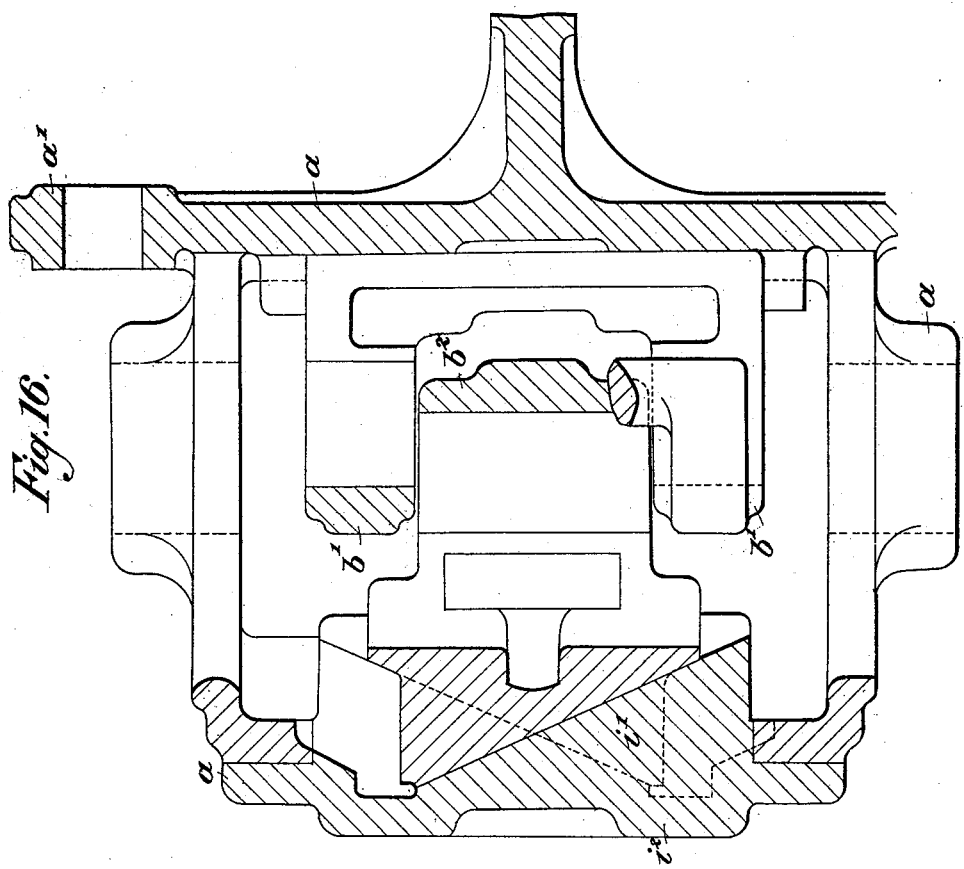
Witnesses
Geo. H. Shippick
A. W. Cook
Inventors
J. P. Roe and
P. R. Bedlington
By their Atty's
Curtis & Crocker

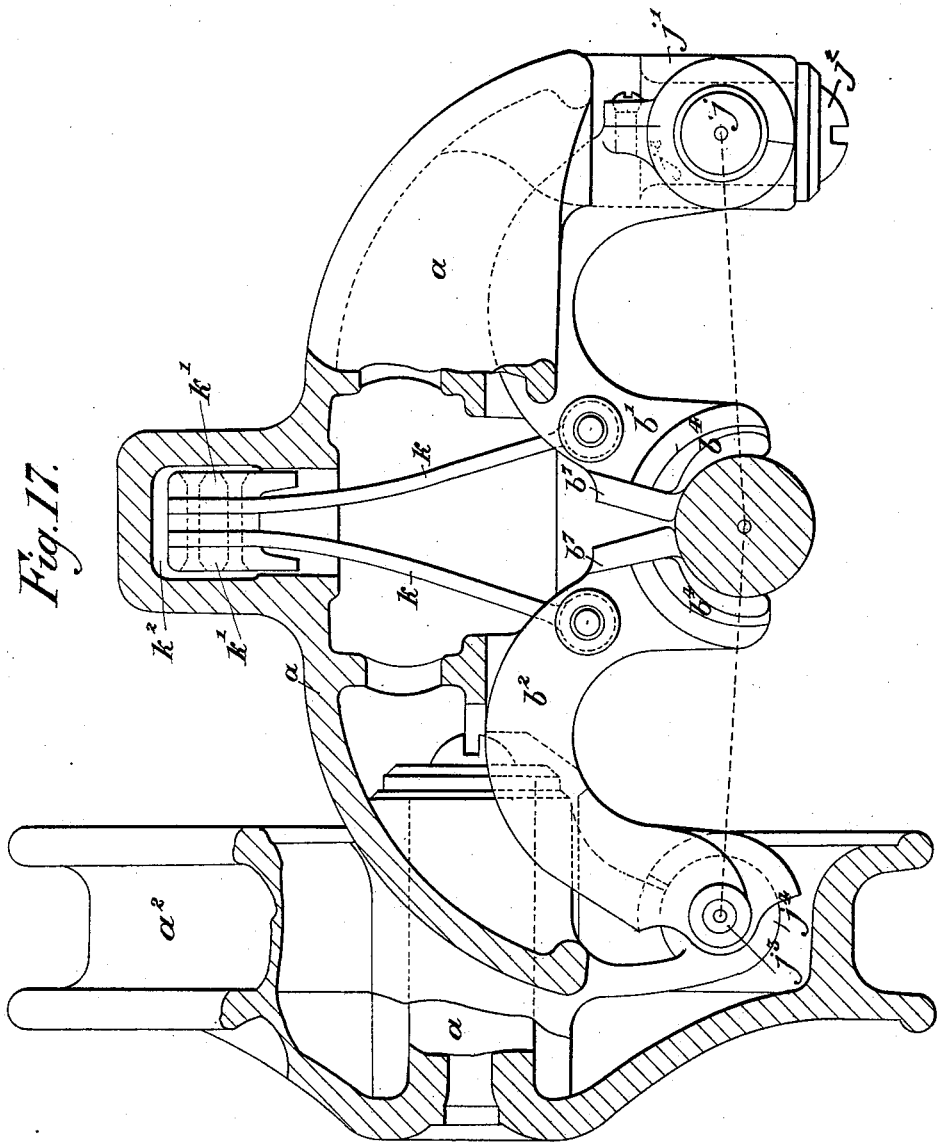

(No Model.) 20 Sheets—Sheet 12.
J. P. ROE & P. R. BEDLINGTON.
CLIP APPARATUS FOR TRANSPORTING LOADS BY MEANS OF ROPES OR CABLES.
No. 338,615. Patented Mar. 23, 1886.
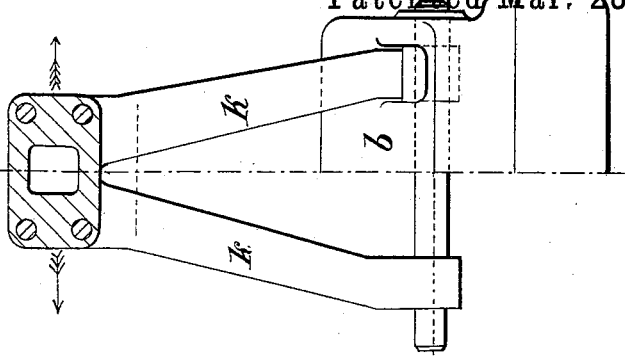
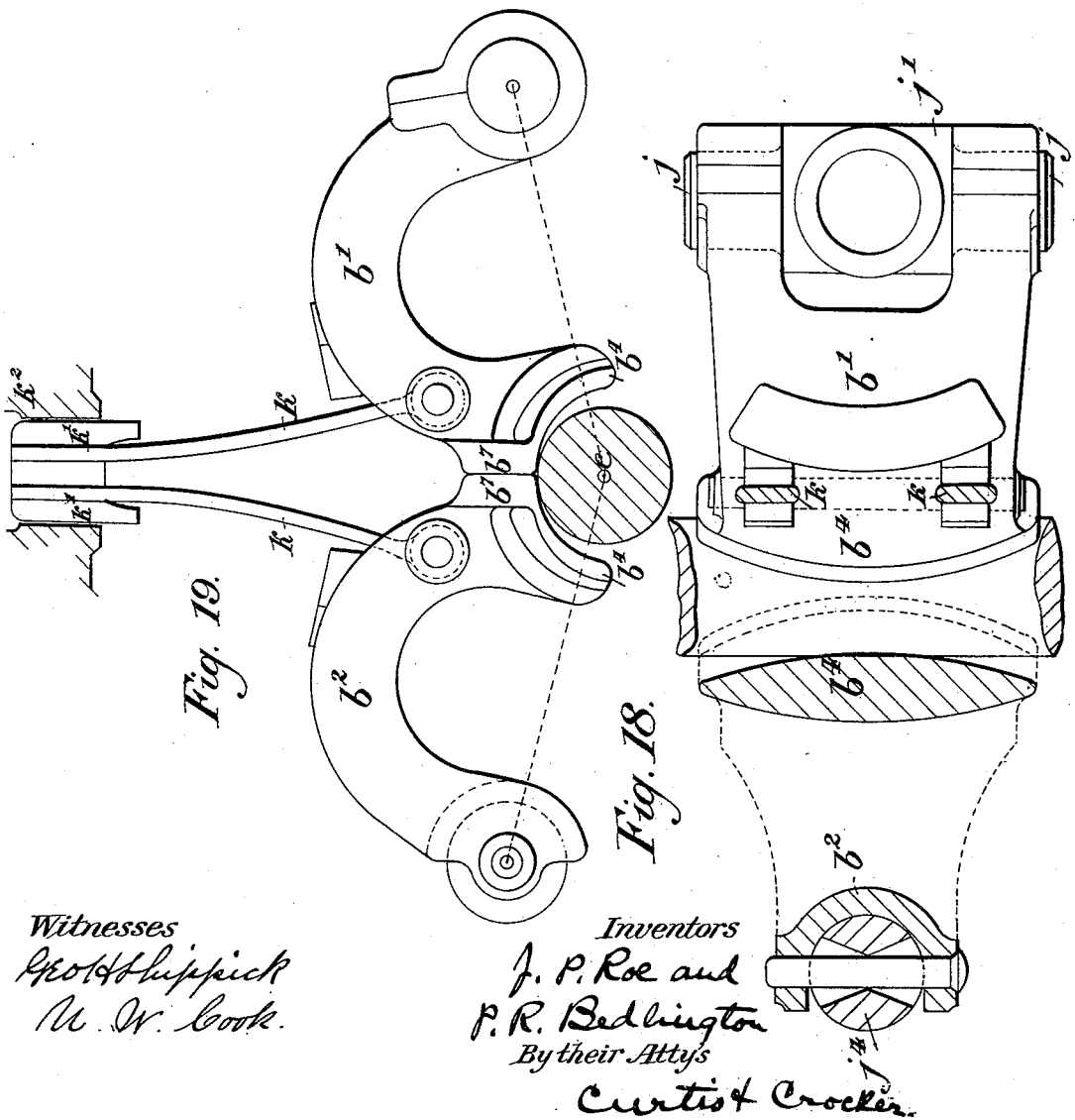
Witnesses
Geo H Shippick
M. W. Cook.
Inventors
J. P. Roe and
P. R. Bedlington
By their Atty's
Curtis & Crocker.

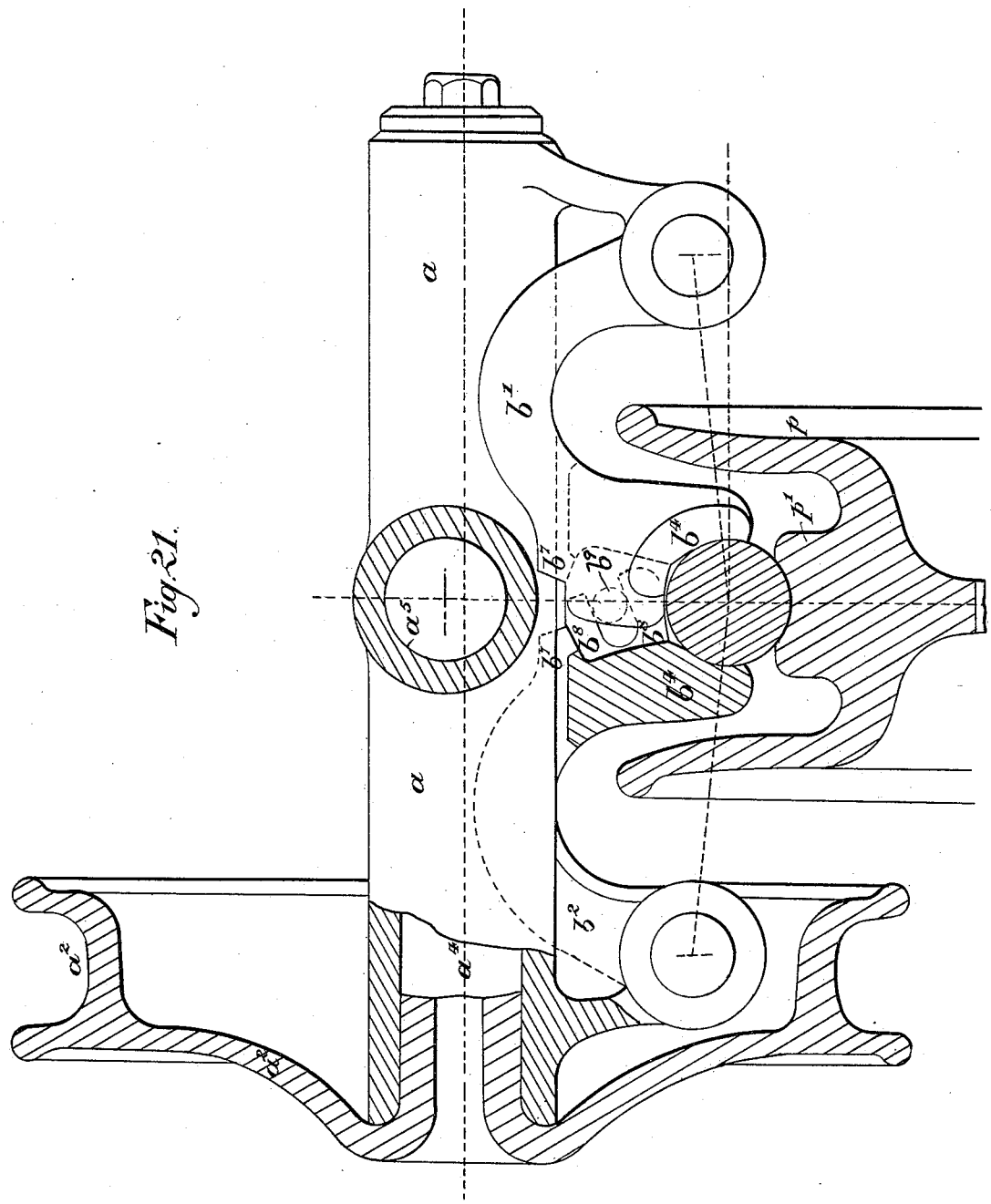

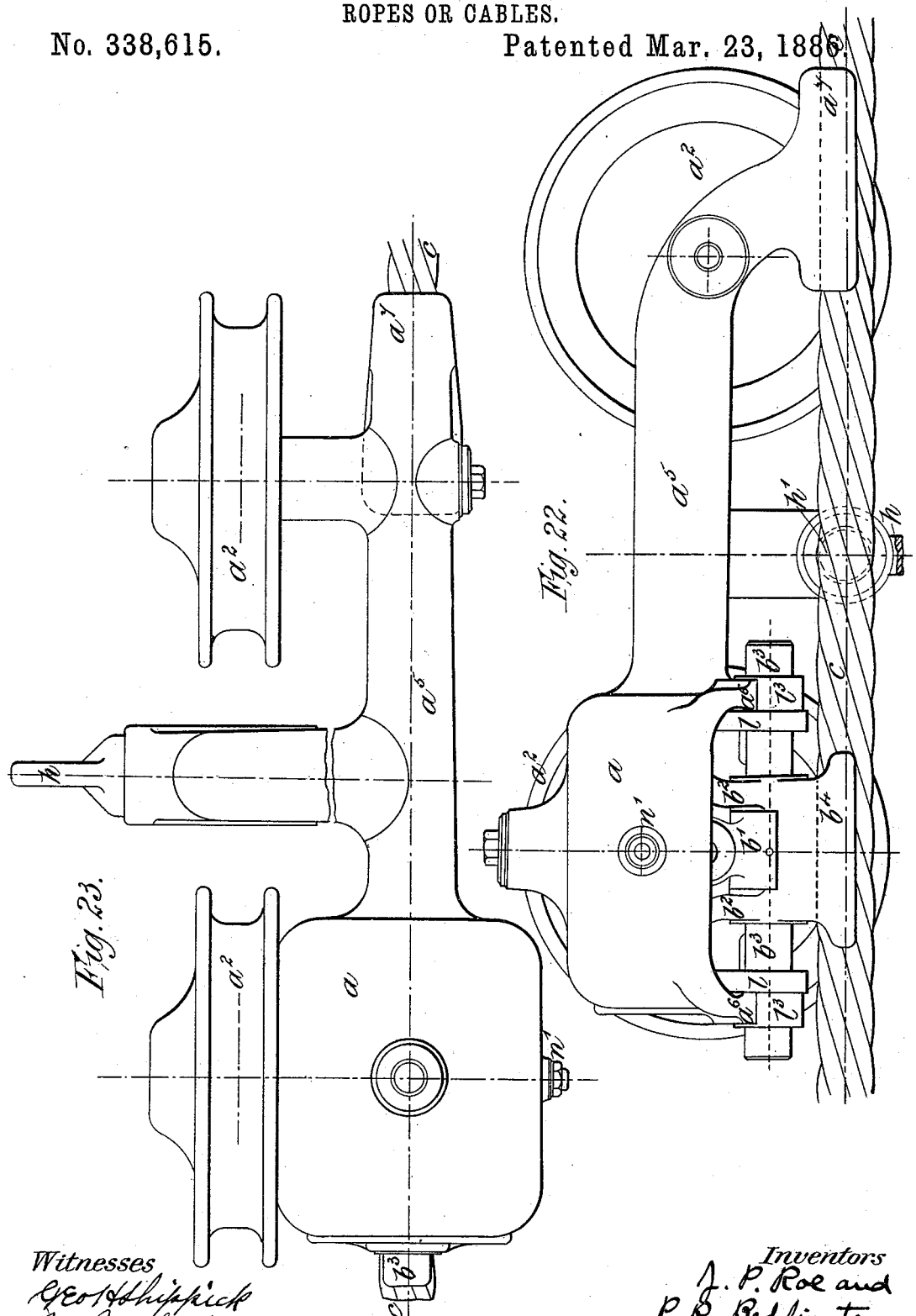

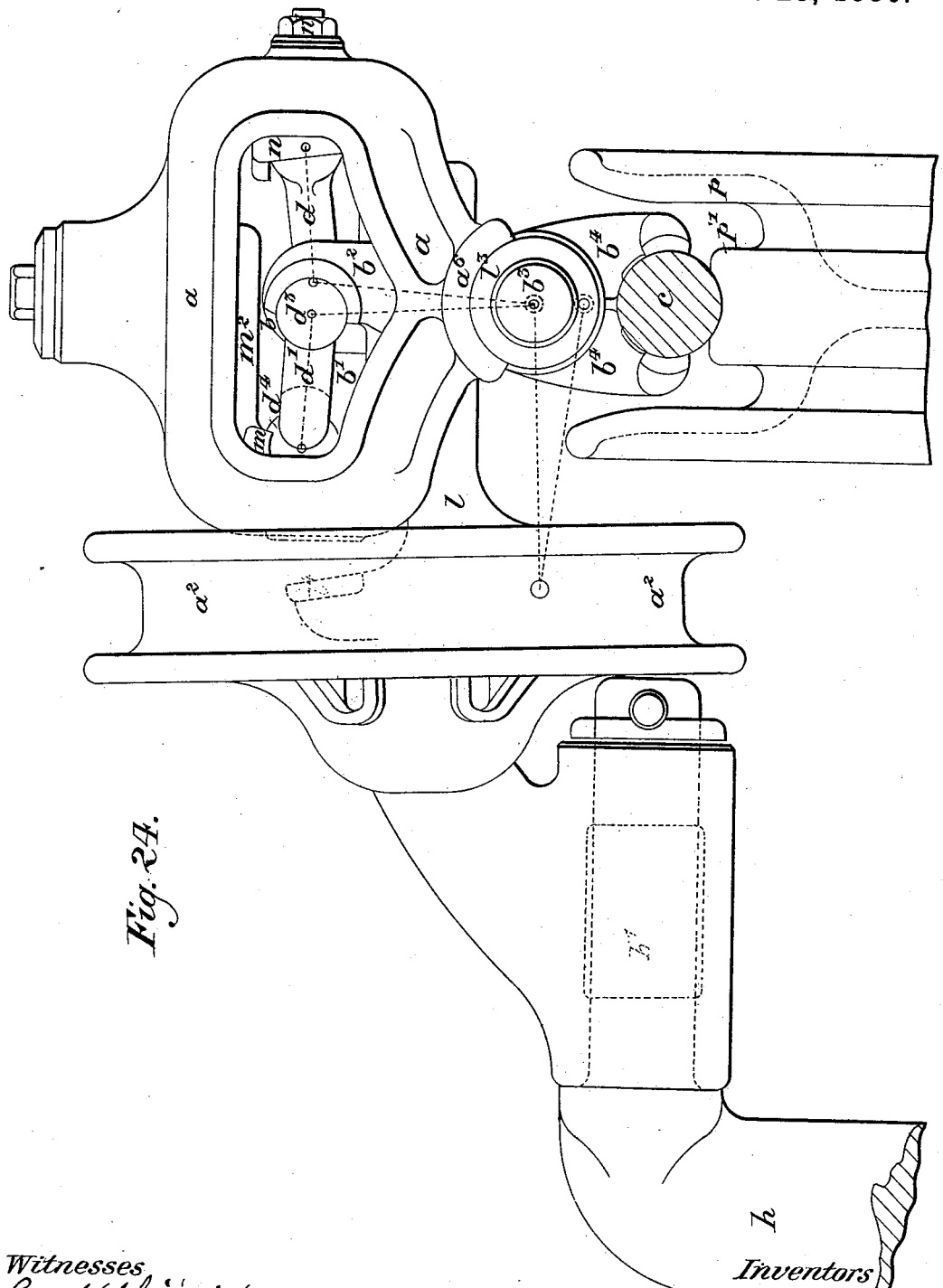

(No Model.) 20 Sheets—Sheet 16.

J. P. ROE & P. R. BEDLINGTON.
CLIP APPARATUS FOR TRANSPORTING LOADS BY MEANS OF ROPES OR CABLES.

No. 338,615. Patented Mar. 23, 1886.

Witnesses
Geo. H. Shippick
U. W. Cook

Inventors
J. P. Roe and
P. R. Bedlington
By their Atty's
Curtis & Crocker

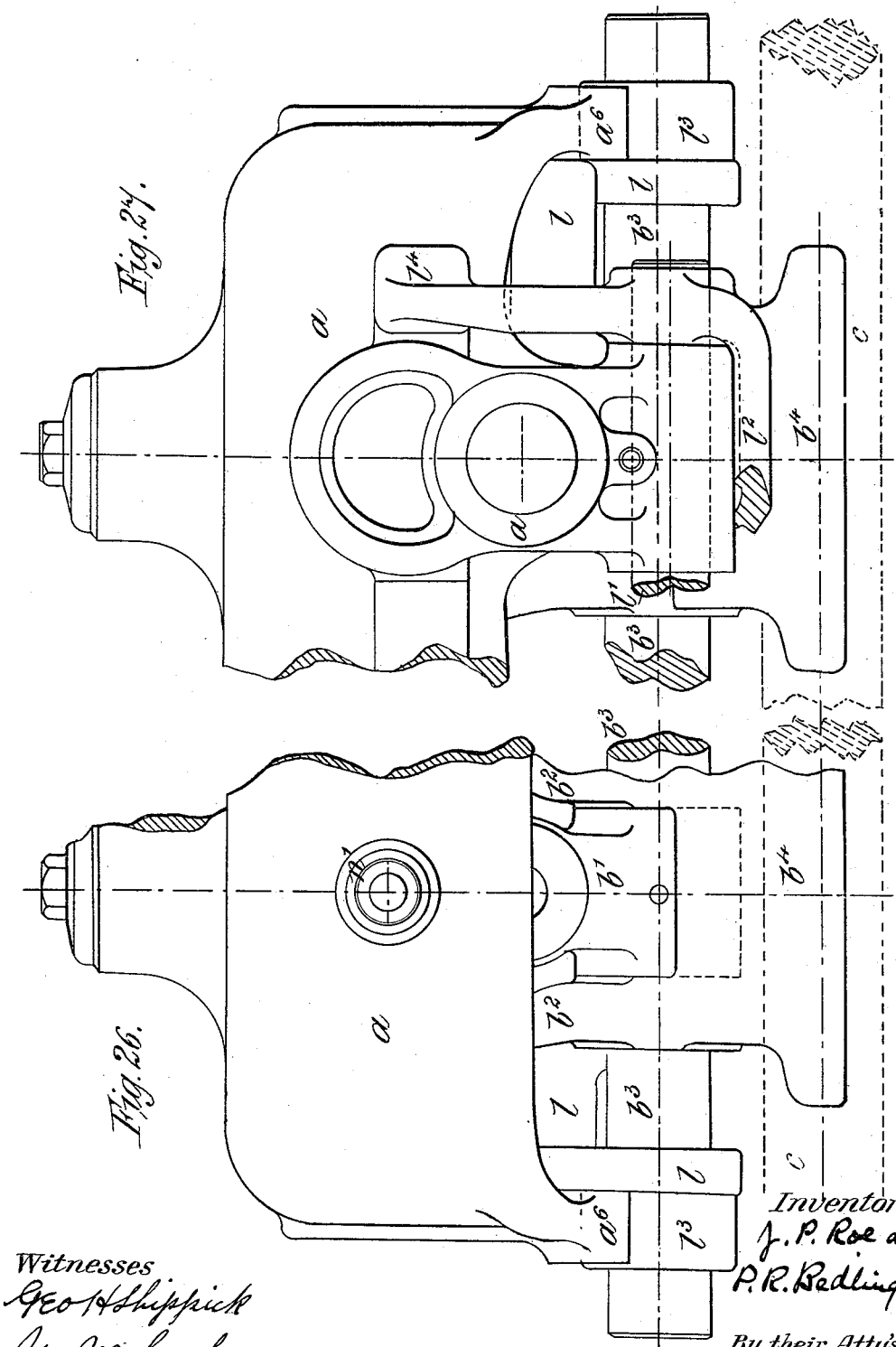

(No Model.) 20 Sheets—Sheet 18.
J. P. ROE & P. R. BEDLINGTON.
CLIP APPARATUS FOR TRANSPORTING LOADS BY MEANS OF ROPES OR CABLES.
No. 338,615. Patented Mar. 23, 1886.
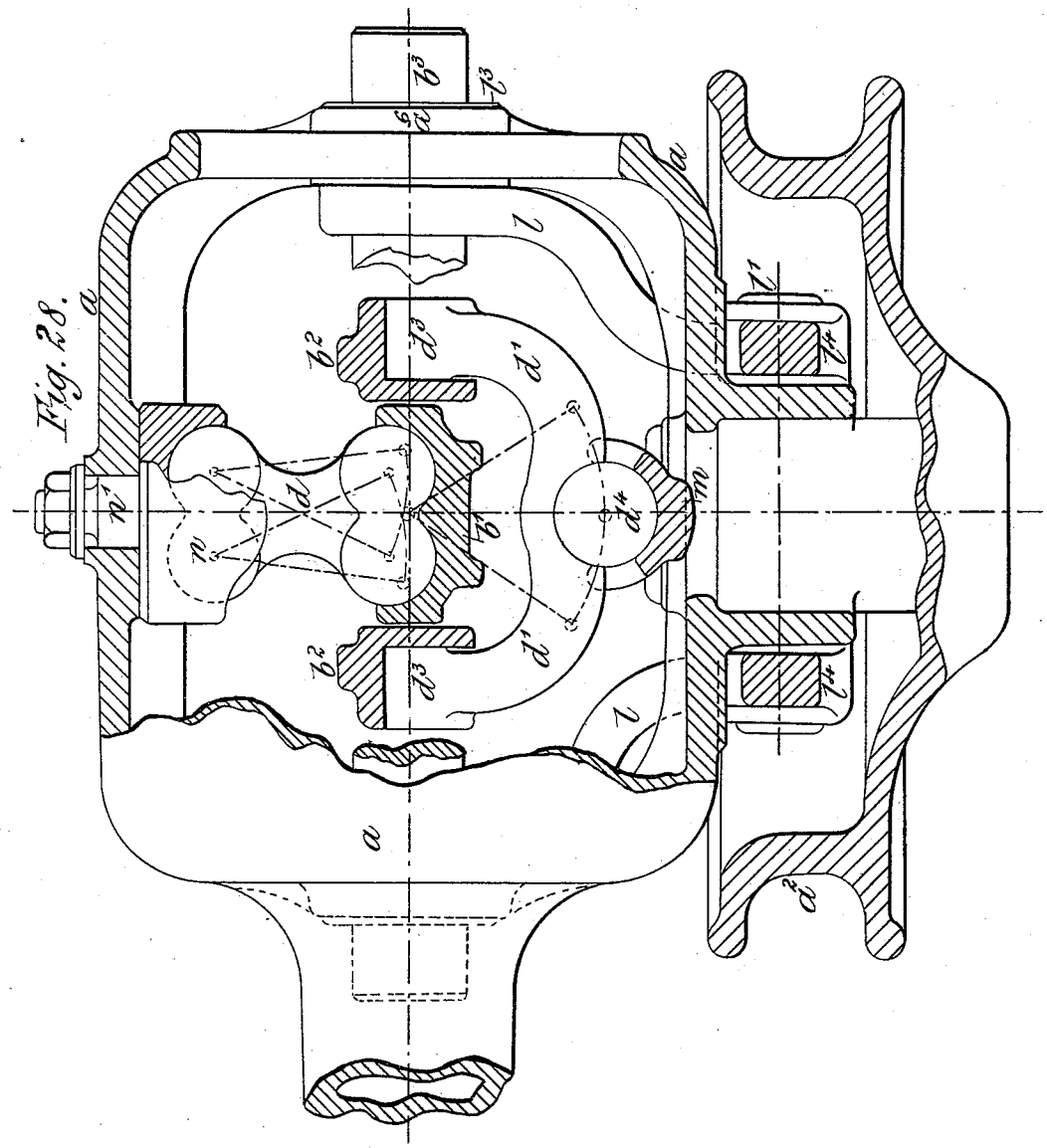
Witnesses
Geo. H. Shippick
A. M. Cook.
Inventors
J. P. Roe and
P. R. Bedlington
By their Atty's
Curtis & Crocker (No Model.) 20 Sheets—Sheet 19.
J. P. ROE & P. R. BEDLINGTON.
CLIP APPARATUS FOR TRANSPORTING LOADS BY MEANS OF
ROPES OR CABLES.
No. 338,615. Patented Mar. 23, 1886.
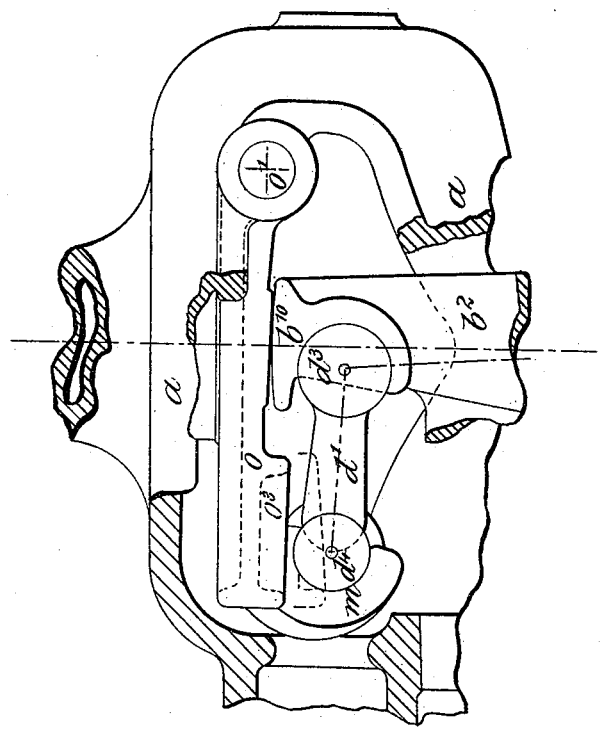
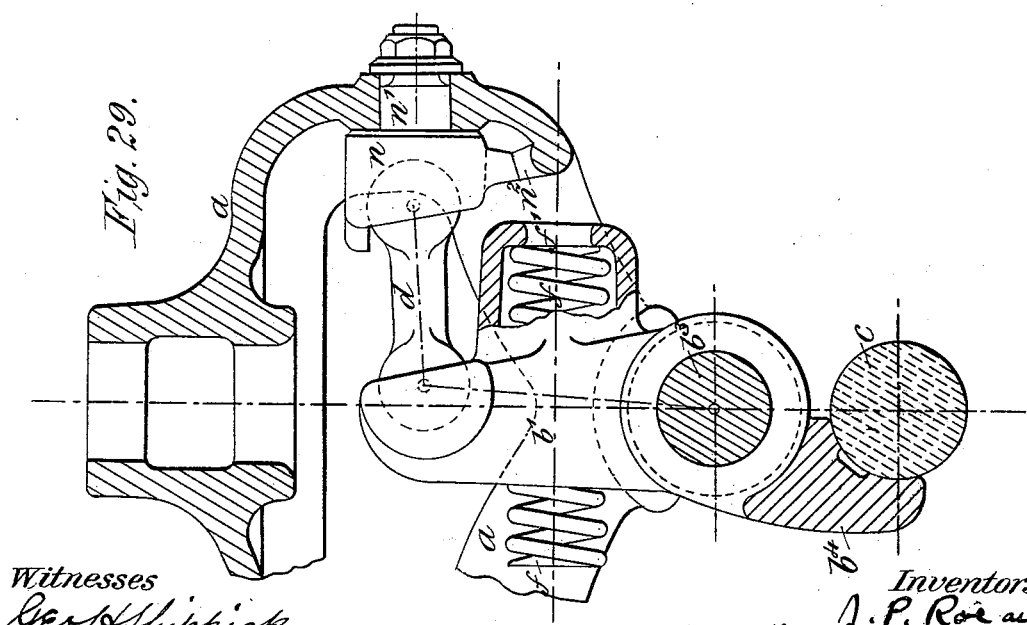

(No Model.) 20 Sheets—Sheet 20.

J. P. ROE & P. R. BEDLINGTON.
CLIP APPARATUS FOR TRANSPORTING LOADS BY MEANS OF ROPES OR CABLES.

No. 338,615. Patented Mar. 23, 1886.

Witnesses
Geo H Shippick
M W Cook

Inventors
J. P. Roe and
P. R. Bedlington
By their Atty's
Curtis & Crocker.

UNITED STATES PATENT OFFICE.

JOHN PEARCE ROE AND PETER ROE BEDLINGTON, OF BILBAO, SPAIN.

CLIP APPARATUS FOR TRANSPORTING LOADS BY MEANS OF ROPES OR CABLES.

SPECIFICATION forming part of Letters Patent No. 338,615, dated March 23, 1886.

Application filed April 10, 1885. Serial No. 161,792. (No model.) Patented in England January 2, 1884, No. 479; in France October 8, 1884, No. 164,690; in Germany October 19, 1884, No. 32,865, and in Spain May 29, 1885, No. 7,136.

*To all whom it may concern:*

Be it known that we, JOHN PEARCE ROE and PETER ROE BEDLINGTON, subjects of the Queen of Great Britain and Ireland, residing at Bilbao, in the Kingdom of Spain, have invented new and useful Improvements in Clip Apparatus for Transporting Loads by Means of Ropes or Cables, (for which we have obtained Letters Patent in Great Britain, dated January 2, 1884, No. 479, granted in the name of William Lloyd Wise as our agent, and held in trust for us, and in France by patent dated October 8, 1884, No. 164,690,) of which the following is a specification.

This invention has reference to means used in conjunction with ropes, wires, or cables (hereinafter called "cables") for transporting loads from place to place; and the improvements are designed, among other things, to enable aerial cables to be used with gradients, curves, and spans, such as cannot be worked advantageously, if at all, with the apparatus ordinarily employed. For these purposes, according to this invention to prevent the slipping of the saddles and escape of the buckets, tubs, or vehicles (hereinafter called "vehicles") on a plain cable working steep gradients, automatic clip-saddles are employed, which rest upon and press the cable at opposite sides with any desired force by converting the downward pressure of the vehicles (proportionate to their weight) into the required squeeze on the cable through the medium of suitable mechanism, as described hereinafter.

The mechanism for actuating the clips may be of various descriptions—such as toggles, wedges, and ball-and-socket joints, universal joints, rollers running on plane, curved, or inclined surfaces, and the like—permitting in the case of the simple clip of the movement of the clip-saddle in a line perpendicular to the cable, and in the case of the compound clip permitting free motion of the hanger-head over the clip-saddle in a plane parallel with the rope. The clips pass through the sheaves between the flanges and the mechanism which operates the clips, passes outside and clear of the sheave-flanges, thus admitting of a narrow clip-saddle and providing ample room for the mechanism. The clip-saddles may be formed with helical grooves or indents corresponding to the lay of the strands or wires of the cable. They may also be lined with metal or other suitable substance run into dovetailed or otherwise formed recesses or grooves in the clip-saddle, or for such a substance as leather or india-rubber pressure may be employed to squeeze it into a recess, or it may be riveted or otherwise secured, as most convenient.

To prevent the jerking of the traveling cable off the sheaves, (which is liable to occur with the arrangements ordinarily employed when, owing to the vehicle's slipping or other causes, the cable is put into oscillation on the sheaves,) deep-channeled safety-sheaves are employed, constructed as hereinafter described, with high flanges, which admit of the saddle clips passing between them, and the clips are provided with taper or cigar-fashioned ends, such that should the cable by chance leave the center of a sheave-tread the passage of a saddle will again replace the rope in its normal or central position.

To avoid on steep gradients the tendency of the saddles to tilt endwise, they are so constructed that the centers of oscillation of the hangers (at their junctions with the saddle-heads) shall be in the same approximately horizontal plane as the center line of the cable, thereby securing a proper distribution of weight on the saddles. The saddle-head to which the vehicle-body hanger is attached is made to partly inclose a toggle-clip, the jaws of which are caused to pinch or squeeze the cable with a pressure that is greater according as the load carried is increased. The saddle-head is constructed with cheeks that prevent escape endwise of the pins that connect the toggle-links and levers of the clip above the cable. The lower part of the saddle-head is constructed to move freely in a vertical sense over the clip-boss, and also to form a lateral guide. In a modification the clip is actuated by a wedge motion, the saddle-head being formed or provided with inclines that act on the clip-levers.

According to another arrangement the clip is caused to close by a movement perpendicular to the cable and the grip is increased by means of wedges brought into operation by the tendency of the load to escape when traveling on inclines. The said wedges operate the clip-levers through toggles free to slide endwise in the saddle-head, and instead of jointing the toggles with pins, a spring is interposed between the clip-levers in such a way as to produce constant thrust and take up slack in one direction. In this arrangement the saddle-head is or may be prolonged beyond the end of the clip, which is reduced in length. Thus on entering a sheave-groove with a displaced cable, the guiding is effected by the advanced portion of the saddle-head.

In a modified arrangement wherein the clip is closed by movement perpendicular to the cable-operating thrust-toggles, and the grip is increased or tightened by movement of the saddle-head along the clip parallel with the cable, a segment of a wheel or roller is provided in conjunction with an inclined surface, the arrangement being such that the said segment is capable of radial movement not only in planes parallel with the cable-axis, but also at right angles thereto. The squeeze on the cable with this form of clip is proportionate to the pull on the cable through the jaws or the tendency of the clip to slip along the cable. A stop is provided to arrest downward motion.

The sheaves on which the cables travel are made with deep flanges, and the rope-tread may be raised so as to give a considerable wearing depth, while presenting a comparatively small surface requiring to be turned up. The raised treads may be cast solid with the sheave-bodies, or may be in the form of separate rings secured in place between the sheave-body and a removable flange. The centers of the sheaves are dished, as already stated, so as to bring the main bearing under the line of the cable, and where curves occur the sheaves are canted or inclined so as to admit of a horizontal change in the direction of the cable at each sheave. Thus shunts are required only where an abrupt change of direction at a considerable angle becomes necessary.

Referring to the accompanying drawings, in which the figures are drawn to different scales, and like letters of reference indicate similar parts, Figure 1 is a side view of a compound saddle-head and clip according to this invention, wherein the clips are actuated by toggles. Fig. 2 is an end view, and Fig. 3 a horizontal section, of the same. Figs. 4, 5, and 6 are detached half-sectional elevations of the saddle-head and clip, Figs. 4 and 5 showing the clips in their closed position upon the cable, while Fig. 6 shows a clip in its open position.

$a$ is the saddle-head; $b$, the clip-saddle, formed of two clips, $b'$ $b^2$, pivoted together at $b^3$, and provided with jaws $b^4$, for grasping the cable $c$.

$d$ is a toggle, one end of which is pivoted in the saddle-head $a$, while its other end is pivoted in a recess in the clip $b'$, as shown, the said toggle being inserted sidewise in its recesses. $d'$ is a second toggle, one end of which is bifurcated at $d^*$, Fig. 4, and formed with an enlarged portion, roller, or segment, $d^2$, provided with teeth $d^3$, gearing into teeth $e$, formed upon the inclined or cam faces $e'$ on the piece $e^2$, pivoted in the saddle-head $a$, Fig. 3. A portion of the piece $e^2$ also enters the bifurcated part of the toggle $d'$, as seen in section, Fig. 4. The other end of the toggle $d'$ forms a ball-and-socket joint in the upper end of the clip $b^2$.

$f$ is a spring, the ends of which rest in chambers or recesses $f'$ $f^2$, formed on the clips $b'$ $b^2$, respectively, and tending constantly to give a slight thrust to open the clip-jaws $b^4$, and thus take up all slack in one direction. By this arrangement loose pins are also avoided.

$b^5$ is a pin or stop on clip $b'$, and projecting into the guard $b^6$, for limiting the motion of the said clip.

$a'$ $a'$ are brackets on the saddle-head $a$, carrying the grooved wheels $a^2$, only one of which is shown pivoted at $a^3$, for supporting the mechanism and attached vehicle upon a shunt-rail at stations.

The action of this apparatus is as follows: When not in use, the clips hang in a downward position, as shown, as far as regards one clip in Fig. 6, but when placed upon the cable they are immediately forced toward each other by the weight of the vehicle, as shown in Figs. 2, 4, and 5. The toggles $d$ $d'$ take up a position nearly at right angles to the clips, forcing their upper ends apart, and closing their lower ends or jaws $b^4$ upon the cable with a force proportionate to the whole weight of the apparatus, vehicle, and load.

The tendency of the apparatus to slip downward along the cable when traversing steep gradients is counteracted by permitting the saddle-head $a$ to have a short motion parallel with the cable, but independent of the clip-saddle, whereby, if the saddle-head slips downward, the teeth $e$ or one of the inclined faces, $e'$, immediately acts upon the teeth $d^3$ or segment $d^2$, causing the toggle $d'$ to press with still greater force upon the clip $b^2$, and gripping the cable with an additional force proportionate to the tendency to slip.

Fig. 7 is an end view of a modified form of the apparatus, wherein the clips (of simple form) are actuated by wedge motion, and Fig. 8 is a vertical section of the same. Fig. 9 is an end view of this modified form of apparatus inserted in its saddle-head, and also showing a vehicle-hanger and a canted sheave in section, and hereinafter referred to. $a$ is the saddle-head; $b$, the clip-saddle, formed of the clips $b'$ $b^2$, and $c$ the cable, as before. The saddle-head $a$ in this modification is formed with recesses $g$ $g$, having inclined surfaces, as shown, and into which the upper ends of the clips $b'$ $b^2$ enter. $b^*$ $b^*$ are pins inserted through these upper ends of the clips and projecting through the slots $g'$ $g'$, formed in the saddle-head, which thus limit the motion of the clips. $h$ is the vehicle-hanger, connected in any suitable manner to the saddle-head. In this arrangement of apparatus it will be seen that when the clips are placed over the cable with the whole weight of the apparatus, vehicle, and load acting vertically, they will be forced inward, their upper ends at the same time being separated by the wedge-shaped projection $g^*$, while their lower ends or jaws, $b^4$, grip the cable, as before.

Fig. 10 is an end view of a slightly-modified form of simple clips operated by toggles. Fig. 11 is a similar view, showing the saddle-head, in which the clips are inserted, and attached parts, and also a portion of a cable-sheave in section, and hereinafter referred to.

Fig. 12 is a plan or top view, partly in section, of the saddle-head and attached parts.

Fig. 13 shows detached side views of clips. $a$ is the saddle-head; $b$, the clip-saddle, formed of the clips $b'$ $b^2$, pivoted at $b^3$, their upper ends being connected to the fixed pin $b^0$ by the toggles $d'$ $d^2$. $h$ is the vehicle-hanger, to which the saddle-head is pivoted, as shown at $h'$. The action of this form of apparatus is similar to that just described—that is to say, perpendicular to the cable—the upper ends of the clips being forced outward and their lower ends inward to grip the cable $c$ by the weight of the whole apparatus acting vertically, the grip on the cable being proportional to the whole weight of apparatus and load.

Figure 8:
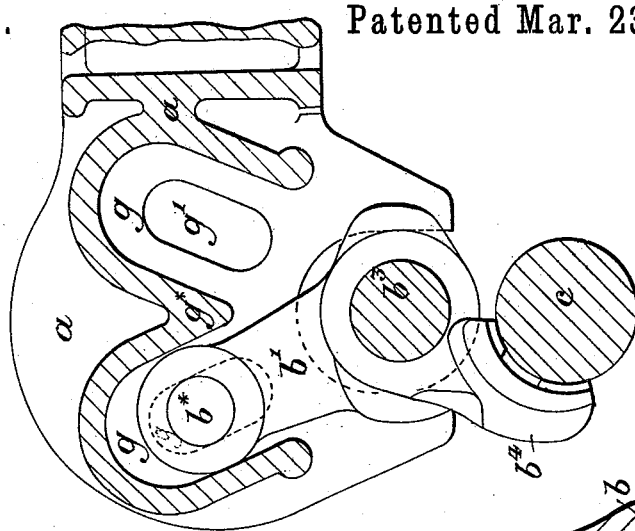
Figure 6:
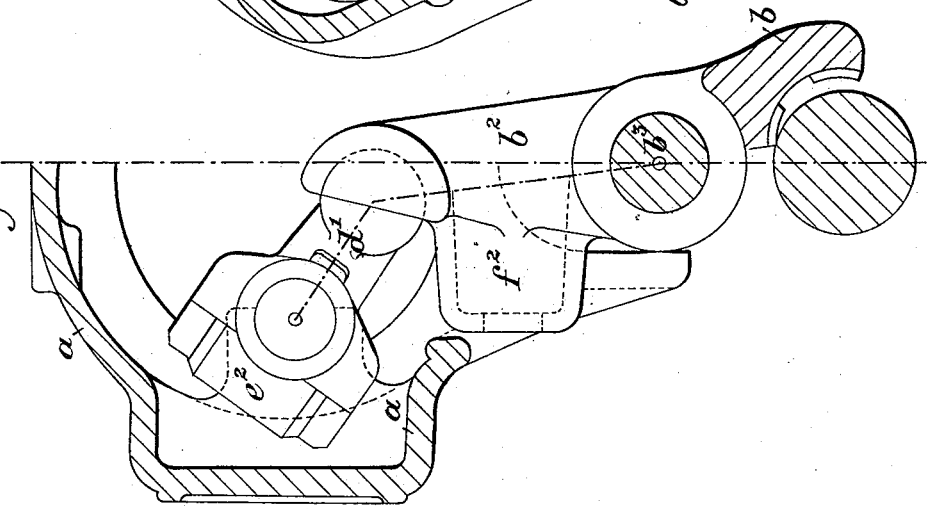
Figure 7:
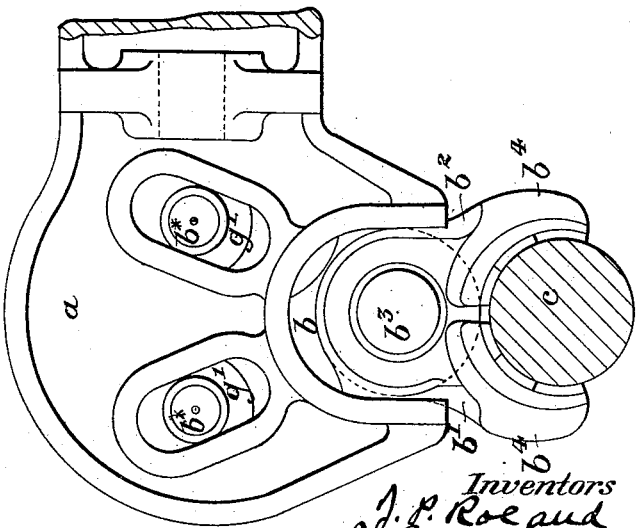
Figure 15:
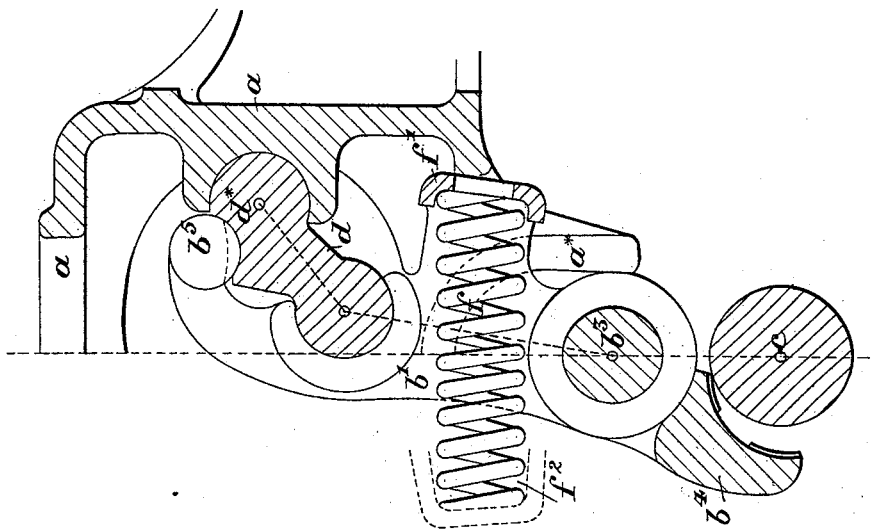
Figure 14:
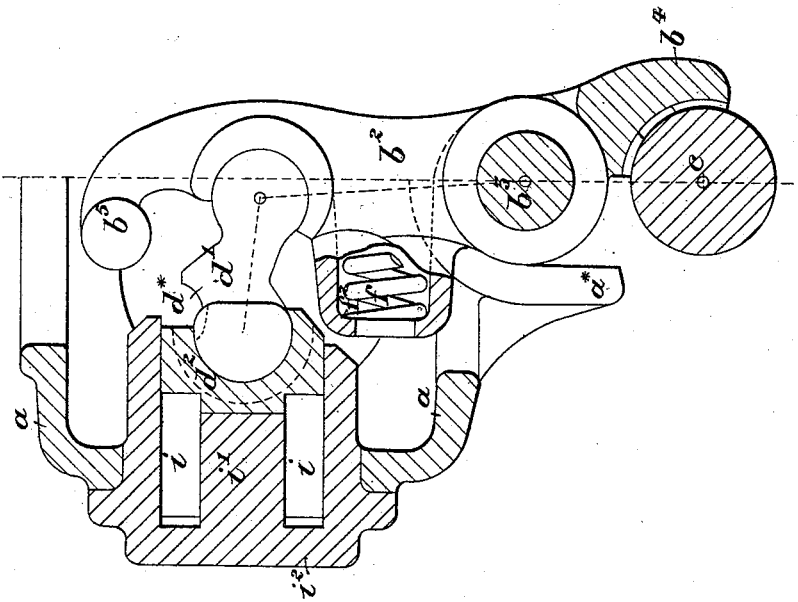

Figs. 14 and 15 are detached sectional views showing a modification, wherein the clips are compound and are operated by toggles and wedges. Fig. 14 shows a clip closed upon the cable, while Fig. 15 shows a clip in its opened position, and Fig. 16 is a horizontal section through the saddle-head, showing the wedges in a central or normal position. $a$ is the saddle-head; $b'$ $b^2$, the clips pivoted at $b^3$; $c$, the cable; $d$ $d'$, the toggles; $f$, the spring resting in recesses $f'$ $f^2$, all of which are somewhat similar in form and action to the corresponding parts shown and described with reference to Figs. 1, 2, 3, 4, and 5, excepting that each clip is provided with a pin or projection, $b^5$, arranged to take into a recess, $d^*$, (see Fig. 15,) formed in the upper side of each of the toggles $d$ $d'$, to limit the downward and opening movements of the clips. $i$ $i$ are right-handed wedges formed in one with or connected to the piece or portion $d^2$, into which one end of the toggle $d'$ is pivoted or has a bearing. $i'$ is a left-handed wedge formed on the piece or portion $i^2$, connected to the saddle-head $a$, the said right and left handed wedges being arranged adjacent to similarly-inclined or wedge-shaped portions formed on the pieces $i^2$ and $d^2$, respectively. The saddle-head $a$, carrying the piece $i^2$, is made capable of a small motion independent of and over the clip-saddle and parallel with the cable, whereby it will be readily seen that when the load passes to a gradient and the saddle-head slides downward a short distance the wedges will come into operation, causing the jaws of the clips $b'$ $b^2$ to grip the cable with an additional force, which is proportional to the tendency to slip. $a^*$ $a^*$ are forks on the lower part of the saddle-head arranged to slide vertically and endwise over the clip's bosses, as shown in Figs. 14 and 15.

Fig. 17 is a sectional view, partly in elevation, of another modification of compound apparatus. Fig. 18 is a plan or top view, partly in section, of portions of the same.

Fig. 19 is an end elevation of the clip-saddle and of the attached parts of the same in their open position.

Fig. 20 is a side view, partly in section, of a spring, hereinafter described, connected to a portion of a clip. $a$, Fig. 21, is the saddle-head pivoted upon and carried by the axis or spindle $a^4$, cast in one with the grooved wheel $a^2$, as shown. $b'$ $b^2$ are clips of a bent form, the gripping or inner ends, $b^4$, of which may be curved or cam-shaped, as more clearly shown in Fig. 18. The outer end of the clip $b'$ is bifurcated and pivoted to the pins $j$, projecting from the piece $j'$, which in turn is pivoted to a pin or projection, $j^2$, from the saddle-head $a$, as shown, and thus forming a universal joint, while the outer end of the clip $b^2$ is pivoted to a pin, $j^3$, passing through a double conical hole, Fig. 18, in the fixed ball-shaped piece $j^4$, over which the said end of the clip $b^2$ can move, the whole substantially forming a ball-and-socket joint. $b^7$ $b^7$ are projecting portions on the inner ends of clips, to hold them in an open position when not in use and to prevent them falling out of position. $k$ $k$ is a double-forked spring, the lower ends of which are connected to the clips $b'$ $b^2$, while its upper end is secured to pieces $k'$, and is free to slide perpendicularly to or parallel with the cable in the chamber or recess $k^2$, formed on the top of the saddle-head $a$. The tendency of the spring $k$ is to support and bring the clips to their normal or central position when they are not urged to one side or the other by the pull of the cable, and to insure the clips working in unison. Various other forms of springs may be employed, provided they be such as to offer great resistance to distortion in a vertical direction or in a direction more or less parallel with the cable, while at the same time they are capable of easily opening and closing laterally, of being slightly twisted, and insuring the working of the clips in unison. The action of this modification of apparatus is as follows: When the clips in their open position, Fig. 19, are placed upon the cable and the weight of the apparatus brought into play, they are forced inward into the position shown in Fig. 17, gripping the cable between them, while, should the whole apparatus, vehicle, and load tend to slip, the clips will move radially on their universal and ball-and-socket joints approximately in the direction of the cable, causing their curved or cam surfaces to grip the cable with an additional force proportional to the tendency to slip, as in the other compound arrangements, hereinbefore described.

Fig. 21 is a sectional end view of apparatus closely resembling that last described with reference to Figs. 17 to 20, but of simpler form. In it, however, the forked spring $k$ $k$ is dispensed with, the clips $b'$ $b^2$ being moved in unison by teeth or teeth and pins $b^8$ $b^9$, respectively, on their inner ends gearing with each other. In this arrangement, also, the gripping-faces of the clips are straight lengthwise, instead of being curved. $b^7$ $b^7$ are projections on the ends of the clips to hold them in an open position when not in use. $a^5$ is a frame or piece projecting forward from the saddle-head, $a$, which is carried by the spindle $a^4$ of the sheave $a^2$, the said piece carrying a nose or cigar-shaped piece, hereinafter referred to.

Figure 25:
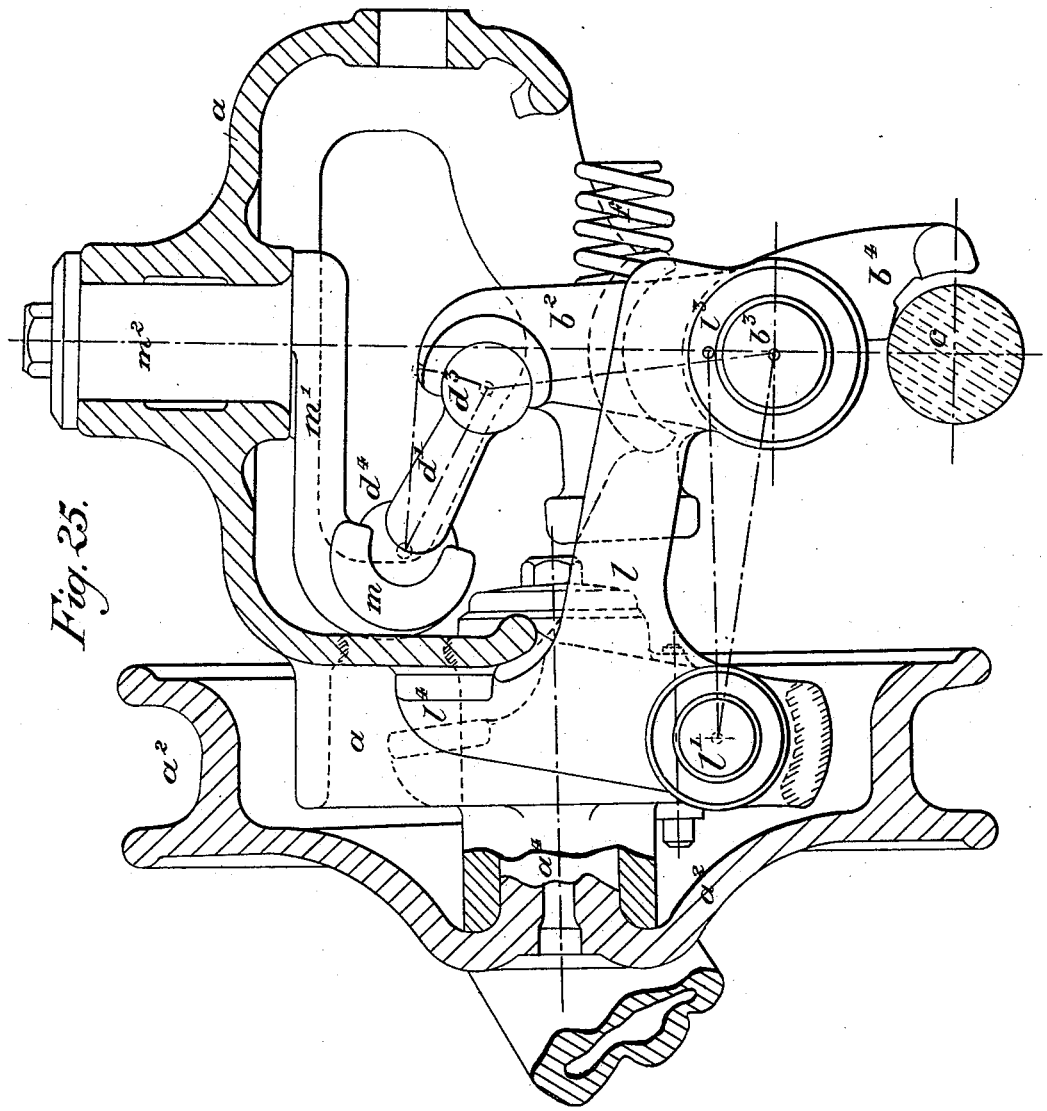
Figure 31:
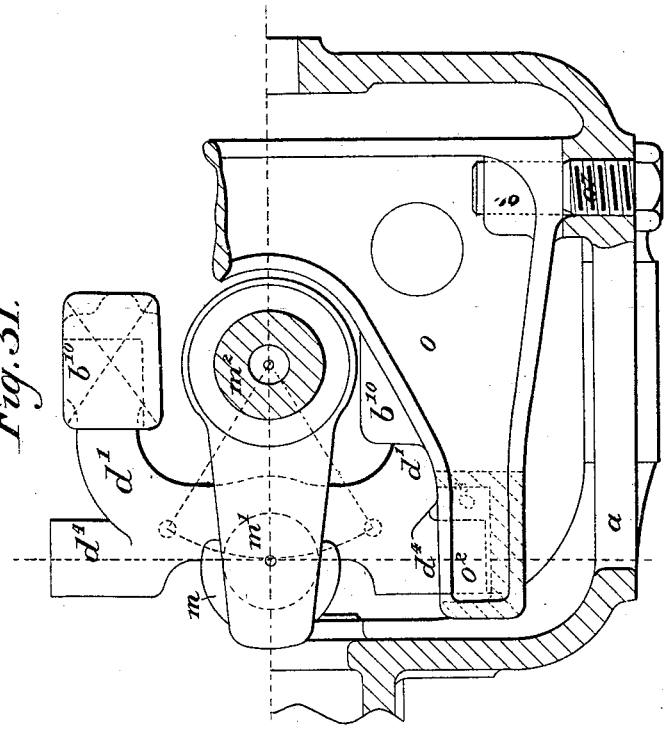

Fig. 22 is a side view, and Fig. 23 a plan or top view, of a further modified form of compound apparatus. Fig. 24 is an elevation of the back end of the said apparatus with a portion of the supporting cable-sheave, and Fig. 25 is a vertical section of a portion of the same. Figs. 26 and 27 are sectional views of opposite sides of part of the saddle-head and attached parts, the groove-sheave $a^2$ being removed; and Fig. 28 is a horizontal section, partly in elevation, of the saddle-head and contained parts, together with the grooved sheave. Figs. 29 and 30 are vertical sectional views of portion of saddle-head and of the contained parts; and Fig. 31 is a horizontal section of a portion of saddle-head, showing a locking arrangement. $a$ is the saddle-head, and $b$ the clip-saddle, formed of the clips $b'$ $b^2$, pivoted on the pin or spindle $b^3$, which in turn is carried by side levers or arms, $l$ $l$, pivoted on the pin $l'$, carried by a projection from the saddle-head $a$. The side levers, $l$ $l$, are conveniently formed in one by uniting their lower ends by the bar or piece $l^2$. The clip $b^2$ in this modification is bifurcated, its upper portions, $b^2$ $b^2$, Figs. 22 and 26, being joined by the jaw $b^4$, while its operating-toggle $d'$ is also bifurcated, as shown in Fig. 28. The outer ends, $d^3$, of the toggle $d'$ are pivoted in the upper ends of the clip $b^2$, its central portion, $d^4$, being formed with a more or less spherical portion, having a bearing in and forming a ball-and-socket joint with the end $m$ of a bent piece, $m'$, pivoted at $m^2$ in the top of the saddle-head $a$. The upper end of the clip $b'$ is also made wide, and formed with a more or less double spherical bearing-surface for the reception of one end of the toggle $d$, which is similarly shaped. The other end of the toggle $d$, similarly formed, is carried by the bearing-piece or thrust-block $n$, fixed in the side of the saddle-head, as shown at $n'$, Figs. 28 and 29, the said block $n$ being prevented from turning by the fixed piece $n^2$, arranged beneath it, or by other convenient means. The ends of the side levers, $l$ $l$, are formed with bosses $l^3$, through which the clip-spindle pin $b^3$, which is prolonged, passes, and has free end movement, and onto which bosses the projecting portions $a^6$ of the saddle-head $a$ take when the levers $l$ $l$ and the clips $b'$ $b^2$ are in their raised and closed position, as shown in Figs. 22, 24, 26, and 27. To limit the downward motion of the clips $b'$ $b^2$, the levers $l$ $l$ are formed with a projecting portion, $l^4$, which bears against one side of the saddle-head, as shown in Figs. 25 and 27, when the clips are not in use, but takes up the position shown in dotted lines, Fig. 25, when they are closed upon the cable. $f$ is a spring for taking up slackness between clips, as before. $a^5$ is a projecting piece or frame, the end $a^7$ of which is cigar-shaped or pointed, and arranged to carry near its end a second groove-sheave, $a^2$. The grooved wheels $a^2$ are preferably arranged slightly inclined to the rest of the apparatus, as shown in Fig. 24; but when they take the shunt-rails at stations and support the load they take a vertical direction, the rest of the apparatus being then slightly inclined and automatically set free from the cable. $h$ is the vehicle-hanger. To prevent the saddle-head moving endwise over the clips until they are closed upon the cable by the completion of the upward movement, a locking-plate, $o$, only one-half of which is shown, is employed pivoted in the ends of the saddle-head, as shown at $o'$, Fig. 31. This plate is formed with projecting portions $o^2$, the under surface of each of which is formed with a recess, $o^3$, closed at its outer side, as shown in dotted lines in Figs. 30 and 31. The plate $o$ assumes an inclined position with its projecting portions $o^2$ resting over projecting end portions, $d^4$, of the double toggle $d'$ when the clips are in their downward and open position, the ends of the recesses $o^2$ embracing the end portions, $d^4$, of the toggle $d'$ and effectually preventing endwise motion. When the clips $b'$ $b^2$ are raised, a cam or wiper, $b^{10}$, at the upper ends of the clip $b^2$, lifts the locking-plate out of contact with the toggle $d'$, thus admitting of end motion of saddle-head when necessary. The saddle-head $a$ is carried by the spindle $a^4$ of one of the sheaves $a^2$, as shown in Fig. 25. The operation of this arrangement of apparatus is similar to that hereinbefore described, except that the extra grip to prevent slipping on inclines is produced by the slight sliding or end motion (or motion in a line with the rope) of the saddle-head moving the piece $m'$ on its pivot $m^2$, and causing the toggle $d'$ to press with greater force upon its clip $b^2$ in a manner that will be readily understood from the above-described operations.

Figure 33:
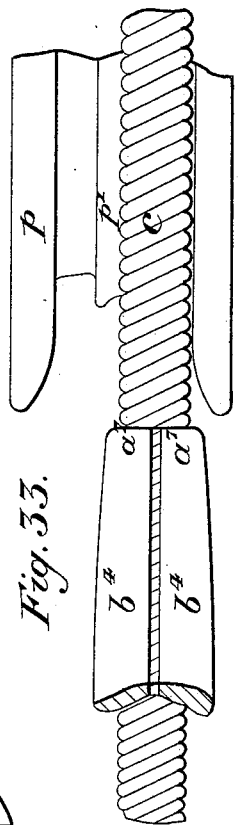
Figure 32:
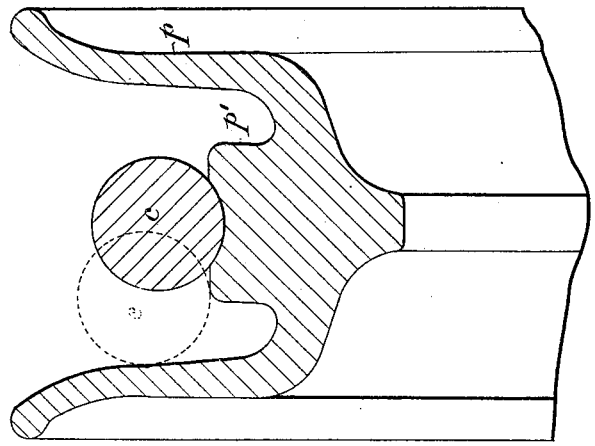

Fig. 32 shows in section a portion of a deep-channeled safety-cable sheave, $p$, according to this invention, and for the purpose hereinbefore stated, provided with a raised tread, $p'$, which gives a considerable bearing and wearing surface. It will be seen by Figs. 9, 11, and 24 that sheaves thus constructed readily admit of the easy passage of the clip-saddles, while, should the cable be accidentally displaced from its tread, as shown in Figs. 32 and 33, the taper or cigar-fashioned ends $a^7$ of the clip, or similar shaped pieces attached to the forward end of the saddle-head, as will be seen by reference to the various views in the drawings, easily and effectually replaces the cable on its tread. Fig. 11 shows a cable-pulley sheave, $p$, dished so as to bring its main bearing $p^2$ under the line of the cable, while Fig. 9 shows a similar sheave, $p$, canted or inclined so as to admit of a horizontal change in the direction of the cable at any sheave. Figs. 11 and 24 show the junction $h'$ of the hangers $h$ with the saddle-heads $a$ approximately in the same horizontal plane as the center line of cable, for the purposes hereinafter stated.

We are aware that the patent to Hallidie, No. 115,309, of May 30, 1871, describes a saddle provided with an automatic clip, consisting of jaws so arranged as automatically to clamp the rope more or less, according to the weight of the load upon the saddle, and we do not broadly claim such a construction.

We are also aware that another patent to Hallidie, No. 115,310, dated May 30, 1871, describes a traveling-cable system in which the cars or buckets are secured to the cable by means of "a thin steel clasp" or strap passing around the cable, and the grooves of the supporting-pulleys are of course made sufficiently large to allow the cable and strap to pass; but this is essentially different from our invention, for the reason that Hallidie merely requires a slightly larger groove in the supporting-pulley, of the same shape as that required to pass the cable itself, whereas, we employ clips which clamp the cable on the two sides, and the cable rests directly upon the supporting-pulley all the time, and the groove of the said pulley is enlarged laterally or made wider in order to allow the clips to pass, and since the clips act as clamps they are necessarily quite large and require considerable lateral enlargement of the groove.

We do not herein claim the supporting-pulleys constructed with dished centers, in order to bring the bearings directly under the cable, as we claim this construction in our second application, Serial No. 161,793, filed the same day, (April 10, 1885.)

What we claim is—

1. The combination, in an automatic clip apparatus, of a saddle-head, a clip-saddle, means operating the jaws thereof automatically to clamp the rope with a force proportionate to the weight of the load, and devices to further increase the grip of the jaws upon the cable in proportion to the steepness of the gradient, substantially as described.

2. The combination, in an automatic clip apparatus, of a saddle-head, a clip-saddle, toggle devices operating the jaws thereof automatically to clamp the rope with force proportionate to the weight of the load, and devices to further increase the grip of the jaws upon the cable in proportion to the steepness of the gradient, substantially as described.

3. The combination, in an automatic clip apparatus, of a saddle-head, a clip-saddle provided with jaws which clamp the rope, and a means operating the jaws automatically to clamp the rope with a force proportionate to the steepness of the gradient, substantially as described.

4. The combination, in an automatic clip apparatus, of a saddle-head, a clip-saddle provided with jaws which clamp the rope, and a connection between the saddle-head and the jaws operating automatically to increase the grip of the jaws upon the cable in proportion to the pull upon the saddle-head, tending to resist the pull of the cable in the opposite direction, substantially as described.

5. The combination, in an automatic clip apparatus, of the saddle-head $a$, the clip-saddle $b$, provided with the clips $b'$ $b^2$, and jaws for clamping the rope, the toggle $d'$, formed with the segment $d^2$, and engaging with the portion $c^2$ of the saddle-head, the toggle $d'$ also operating the clips, so as to clamp the rope with more or less force according to the resisting pull on the saddle-head, substantially as described.

6. The combination, in apparatus for transporting by means of traveling cables, with the traveling cable and clips carried thereby, said clips consisting of jaws which clamp the said cable upon the sides, of supporting pulleys or sheaves provided with grooves enlarged laterally or made sufficiently broad to allow the clips to pass.

7. The combination, with apparatus for transporting loads by means of a traveling cable, of a clip formed with tapering ends constructed to pass between the flanges of the supporting-sheaves, substantially as described.

8. The combination, in apparatus for transporting by means of traveling cables, with supporting-pulleys, provided with grooves sufficiently broad to allow the clips to pass, of clips formed with tapering ends, substantially as described.

JOHN PEARCE ROE.
PETER ROE BEDLINGTON.

Witnesses:
RICARDO DE VILDOSOLA,
TEODORO MENDIZABAL.